United States Patent [19]

Mennicke et al.

[11] Patent Number: 4,555,846
[45] Date of Patent: Dec. 3, 1985

[54] METHOD FOR THE MANUFACTURE OF AN ELECTROCHEMICAL STORAGE CELL AS WELL AS A STORAGE CELL PRODUCED BY THIS METHOD

[75] Inventors: Stefan Mennicke; Karl Reiss, both of Leimen-Gauangellock, Fed. Rep. of Germany

[73] Assignee: Brown, Boveri & Cie AG, Mannheim-Käfertal, Fed. Rep. of Germany

[21] Appl. No.: 450,765

[22] Filed: Dec. 17, 1982

[30] Foreign Application Priority Data

Dec. 21, 1981 [DE] Fed. Rep. of Germany ....... 3150702

[51] Int. Cl.$^4$ ............................................. H01M 6/00
[52] U.S. Cl. ................................... 29/623.5; 29/623.1; 264/29.5; 264/311; 264/105; 429/104
[58] Field of Search ............... 29/623.1, 623.4, 623.5; 429/104; 264/29.2, 29.5, 311, 105

[56] References Cited

U.S. PATENT DOCUMENTS

| | | | |
|---|---|---|---|
| 3,969,124 | 7/1976 | Stewart | 264/29.5 |
| 4,123,596 | 10/1978 | Robinson | 429/104 |
| 4,127,634 | 11/1978 | Joó | 429/104 |
| 4,131,226 | 12/1978 | Breiter et al. | 29/623.5 |
| 4,169,120 | 9/1979 | Miller | 429/104 |
| 4,294,005 | 10/1981 | Brennan | 264/105 |
| 4,413,043 | 11/1983 | Steinleitner et al. | 429/104 |
| 4,414,296 | 11/1983 | Mennicke et al. | 429/104 |

Primary Examiner—Howard N. Goldberg
Assistant Examiner—P. Echols
Attorney, Agent, or Firm—Herbert L. Lerner; Laurence A. Greenberg

[57] ABSTRACT

Method for the manufacture of an electrochemical storage cell of the sodium and sulfur type, with at least one anode space and one cathode space as well as an alkali ion conducting solid electrolyte separating the two, where at least one cathodic current collector and one electron-conducting matrix material are arranged in the cathode space. The invention is characterized by the features that in the cathode space at least one strongly anisotropic felt is inserted with the principal fiber direction parallel to the solid electrolyte; the felt is impregnated with at least one dissolved duromer; and thereupon a larger amount of the duromer is collected in the vicinity of the cathodic current collector; and the duromer is subsequently coked.

6 Claims, 5 Drawing Figures

FIG. 2a
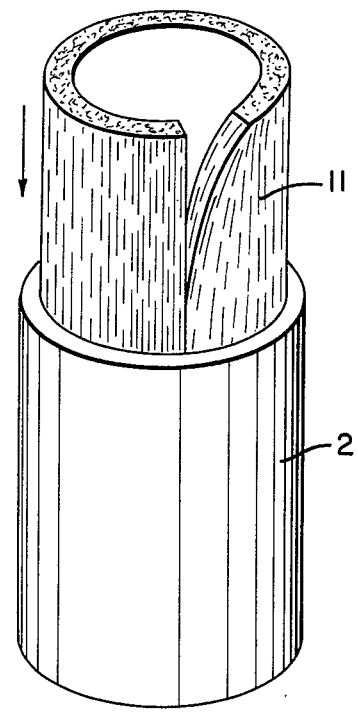
FIG. 2b
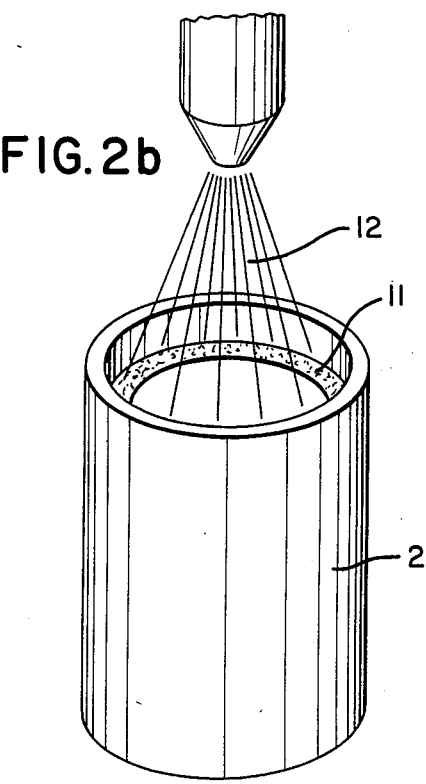
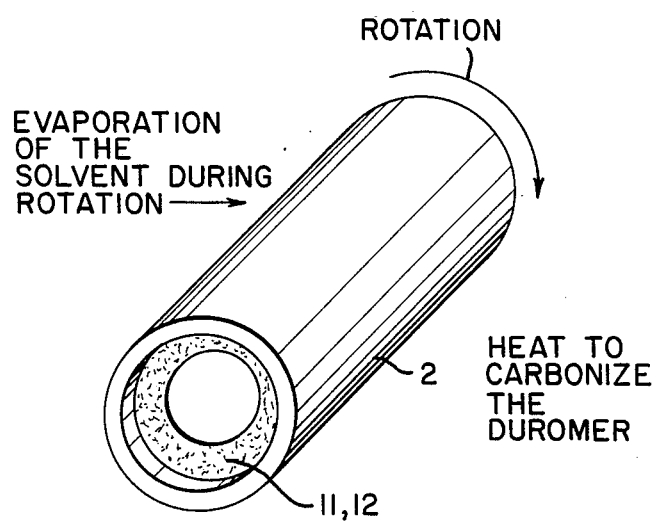
FIG. 2c
FIG. 2d
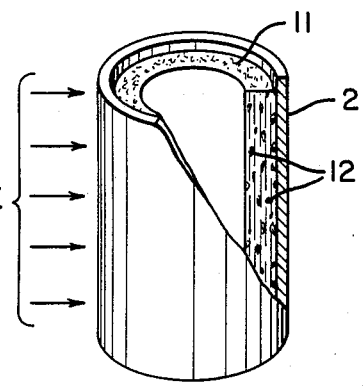

METHOD FOR THE MANUFACTURE OF AN ELECTROCHEMICAL STORAGE CELL AS WELL AS A STORAGE CELL PRODUCED BY THIS METHOD

BACKGROUND OF THE INVENTION

1. Field of the Invention

The invention relates to a method for the manufacture of an electrochemical storage cell of the sodium and sulfur type, with at least one anode space and one cathode space as well as an alkali ion conducting solid electrolyte separating the two spaces, and with an least one cathodic current collector and one electron-conducting matrix material arranged in the cathode space, as well as to a storage cell produced by this method.

2. Description of the Prior Art

Such rechargeable electrochemical storage cells with solid electrolytes are well suited for building storage batteries of high energy and power density. The solid electrolytes used in alkali/sulfur storage cells, made for instance of β-aluminum oxide, are characterized by the fact that the partial conductivity of the mobile ion is very high and the partial conductivity of the electrons is smaller by multiple powers of ten. By using such solid electrolytes for the construction of electrochemical storage cells, practically no self-discharge is obtained, since the electron conductivity is negligible and the reaction substances cannot travel through the solid electrolytes as neutral particles. It is an advantage of these electrochemical storage cells of the sodium and sulfur type that no electrochemical secondary reactions occur during the charging. The reason therefor is again that only one kind of ion can travel through the solid electrolyte. The current yield of such a sodium/sulfur storage cell is therefore approximately 100%. In these electrochemical storage cells, the ratio of energy content to the total weight of such a storage cell is very high as compared to a lead storage cell, since the reaction substances are light and considerable energy is released in the electrochemical reaction. Electrochemical storage cells of the sodium and sulfur type therefore have considerable advantages over conventional storage batteries such as lead storage batteries. To ensure proper operation of such storage cells, the cathode is made of an electron-conducting matrix material, in the pore structure of which the melted active matter, sulfur and sodium polysulfide, can be absorbed. The resistivity of the matrix material should not exceed 10 Ohm.cm, and should be, if possible, about 1 Ohm.cm. Because of the extraordinary aggressivity of the cathodic melt, only felt-like matrix materials of the carbon type have found acceptance to date. A common feature of these felts is the structure of the fiber layers, the fibers of which are connnected to each other by needling. The principal fiber directions are parallel to the felt plane in these felts. As a result, the electric conductivity parallel to the felt plane is greater than the electric conductivity perpendicular thereto. In the manufacture of sulfur electrodes for electrochemical storage cells care must therefore be taken that in the situation where the felt is built into the cathode space with its surface parallel to the surface of the solid electrolyte, a relatively large amount of felt is used in order to obtain the desired conductivity transversely to the principal fiber direction. As a result, the felt must be heavily compressed before it is built into the storage cell, particularly into the cathode space. This leads to breakage of a large number of fibers. This, in turn, leads to a loss of elasticity of the felt. The possibility exists of prefabricating the sulfur electrode and then building it into the cathode space, or else preparing the sulfur electrode directly within the cathode space. In prefabricated sulfur electrodes, contact with the cathodic current collector is usually established by the elastic expansion of the felt used as the matrix material, after the sulfur is melted. If a rigid matrix material is used for obtaining the sulfur electrode, the making of contact with one side of the matrix material and the housing and contact of the other side of the matrix with the solid electrolyte presents a problem that has not yet been solved satisfactorily.

U.S. Pat. No. 4,169,120, disclosed an electrochemical storage cell of the sodium and sulfur type. The cathode space of this storage cell is filled with graphite fibers which are cut very stort and are mixed with a resin. The matter formed of the graphite fibers and the resin is compressed and filled into the cathode space with a predetermined density. In addition, the entire cathode charge is coked and saturated with sulfur. The matrix material used here does not have the required elasticity, so that the desired contacts between the matrix material and the solid electrolyte, as well as with the cathode current collector, are not provided. Due to this disadvantage, the storage cell does not have the required conductivity which is necessary for proper functioning of the storage cell.

SUMMARY OF THE INVENTION

An object of the invention is to provide a method for manufacturing an electrochemical storage cell which has a sulfur electrode with a substantially higher conductivity than the sulfur electrodes of the storage cells known heretofore. The sulfur electrodes in accordance with the method can be manufactured efficiently and economically.

With the foregoing and other objects in view, there is provided in accordance with the invention a method for the manufacture of an electrochemical storage cell based on alkali metal and chalcogen with at least one anode space for the alkali metal anolyte and a cathode space for the chalcogen catholtye, with the anode space and the cathode space separated from each other by an alkali ion conducting solid electrolyte, and with at least one cathode current collector and one electron-conducting matrix material arranged in the cathode space, the improvement comprising inserting into the cathode space an anisotropic felt with its principal fiber direction parallel to the solid electrolyte, impregnating the felt with a solution of a duromer dissolved in a solvent, disposing a major amount of said duromer in the vicinity of said cathodic current collector, and subsequently carbonizing the duromer in the cathode space while a major amount of the duromer is disposed in the vicinity of the cathodic current collector.

In accordance with the invention, there is provided an electrochemical storage cell based on alkali metal and chalcogen with at least one anode space for the alkali metal anolyte and a cathode space for the chalcogen catholyte, with the anode space and the cathode space separated from each other by an alkali ion conducting solid electrolyte, and with at least one cathode current collector and one electron-conducting matrix material arranged in the cathode space, the improvement comprising an anisotropic felt in the cathode space with the principal fiber direction of the felt parallel to the solid electrolyte, the fibers of the felt being connected to the cathode current collector and to each other with carbonized duromer in an electrically conducting manner, said connections of the felt fibers to each other and to the cathodic current collector being effected by impregnating the felt with duromer and applying heat to the duromer to effect its carbonization.

Other features which are considered as characteristic for the invention are set forth in the appended claims.

Although the invention is illustrated and described herein as embodied in a method for the manufacture of an electrochemical storage cell as well as a storage cell produced by this method, it is nevertheless not intended to be limited to the details shown, since various modification may be made therein without departing from the spirit of the invention and within the scope and range of equivalents of the claims.

BRIEF DESCRIPTION OF THE DRAWINGS

The invention, however, together with additional objects and advantages thereof with be best understood from the following description when read in connection with the accompanying drawings in which FIG. 1 diagrammatically illustrates an electrochemical storage cell of the sodium and sulfur type produced by the method in accordance with the invention. The cell has a metal housing with a solid electrolyte disposed in and spaced from the housing. The space between the metallic housing and the solid electrolyte is the cathode space. A carbon or graphite felt is inserted in the cathode space with the principal fiber direction parallel to the longitudinal axis of the storage cell. The felt is saturated with a carbonizable resin, duromer, such as phenolic resin, dissolved in a readily vaporizable solvent such as ethanol. The resin is distributed in the cathode space, for example by centrifugal force, to place a large amount of the resin adjacent the metallic housing. Evaporation of the solvent, followed by carbonization of the resin cements the fibers to the metallic housing.

FIG. 2a illustrates inserting the felt into the cathode space of the housing with its principal fiber direction parallel to the solid electrolyte.

FIG. 2b shows impregnating the inserted felt with a carbonizable resin dissolved in a solvent.

FIG. 2c shows rotation of the housing with the contained impregnated felt to dispose a major amount of duromer in the vicinity of the cathode current collector and the evaporation of the solvent.

FIG. 2d shows carbonizing the duromer while a major amount of the duromer is disposed in the vicinity of the cathode current collector.

DETAILED DESCRIPTION OF THE INVENTION

Figure 1:
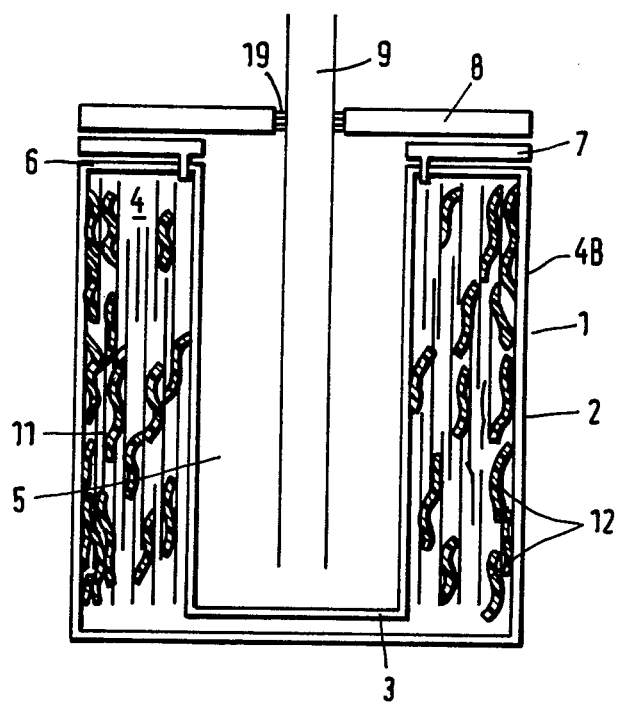

The felt filled into the cathode space is impregnated with a phenolic resin which is first dissolved in ethanol. The amount of solvent used, particularly the amount of ethanol is 50 to 95% by weight. The weight statement refers to the total weight of the solvent and resin, called duromer, to be dissolved, particularly of the phenolic resin.

According to the invention, a large amount of the duromer is arranged in the vicinity of the cathodic current collector. In cylindrical storage cells with a cup-shaped solid electrolyte, the cup-shaped metal housings serve as the cathodic current collectors, particularly in the case in which the cathode space is disposed between the solid electrolyte and the housing. In these storage cells, the above-described distribution of the duromer can be obtained within the cathode space by rotation of the storage cells about their longitudinal axis. If such a storage cell, in the cathode space of which a felt impregnated with phenolic resin is contained, is set into such rotary motion, the duromer is transported outward, toward the inside surface of the metallic housing, due to the action of centrifugal force. A smaller amount of the duromer remains between the fibers of the felt. The distribution of the duromer is preferably made while the solvent is evaporating. After the solvent, e.g. the ethanol, has evaporated completely and the duromer is distributed in the desired manner within the cathode space, the latter is coked or carbonized at a temperature between 500° and 1500° C.

An electrochemical storage cell made in accordance with the method of the invention on the basis of sodium and sulfur is characterized by the feature that at least one heavily anisotropic felt is inserted into the cathode space with the principal fiber direction parallel to the solid electrolyte; is impregnated with at least one duromer; the fibers of the felt are connected in an electrically conducting manner to the cathodic current collector and to each other via the coked duromer.

The phenolic resin used for impregnating the felt acts as an adhesive and joins the fibers of the felt to the cathodic current collector. This bond is not destroyed when the phenolic resin is carbonized or coked. The largest part of the duromer is used for connecting the felt fibers to the cathodic current collector. The remaining amount of the duromer remains between the fibers of the felt and joins the latter together. Here also, the bond between the fibers is not lost by the coking of the phenolic resin. Rather, the duromer is converted by the coking such that electrically conducting paths are formed between the cathodic current collector and the fibers of the felt, as well as between the fibers of the felt themselves. The electrons can be introduced in the reactant or discharge therefrom via these paths. During the discharge of the storage cells, for instance, the electrons are conducted from the cathodic current collector via the above-described conduction paths into the reactant. This makes possible the chemical reactions within the cathode space required for the discharge, and an optimum discharge of the storage cell is ensured. In the same manner, the charging of the storage cell is facilitated by the above-described measures. According to the invention, a heavily anisotropic felt with long fibers is filled into the cathode space which completely fills the space between the solid electrolyte and the cathodic current collector. This anisotropy is very strongly pronounced in carbon and graphite felts which consist of coked pitch fibers. In these felts, the fibers are needled together less. The felt stiffened with the coked duromer exhibits the elasticity required for its application in addition to improved conductivity. Due to this property it is possible to insert solid electrolytes with appreciable geometric deviations from the ideal tubular form into the cup-shaped housing, such that the tubular electrolyte is closely surrounded on all sides by the felt, particularly its fibers. This prevents the formation of voids within the cathode space in which macroscopic phase separation can occur, and thereby the long-term behavior of the storage cell is improved.

With the above-described measures, a cost-effective sulfur electrode for a sodium/sulfur storage cell can be manufactured. The anisotropic felt used for the development of the sulfur electrode is substantially less expensive than the heavily needled felt-like matrix materials used heretofore. By virtue of the saturation of the felt with the duromer, the elasticity thereof is changed and in particular is improved to such an extent that it is comparable to the elasticity of the felts used heretofore.

In the following, the invention will be explained with reference to the FIG. 1.

In the drawing, an electrochemical storage cell 1 is shown in a vertical cross section. The electrochemical storage cell of the sodium and sulfur type has a metallic housing 2 which is cup-shaped. A cup-shaped solid electrolyte 3 is arranged in the interior of the cup-sjhaped housing 2. The solid electrolyte 3 is made of $\beta$-alumina. Its dimensions are chosen to form a coherent space 4 between the inner boundary surfaces of the metallic housing 2 and its outer boundary surfaces. Space 4 serves as the cathode space in the embodiment example shown here. The interior of the solid electrolyte 3 is used as the anode space 5. The metallic housing 2 is provided at its open end with an inward-pointing flange 6 on which the outward-pointing flange 7 of the solid electrolyte is placed. The flange 7 of the solid electrolyte 3 is formed by an insulating ring which is made of $\alpha$-aluminum oxide. The connection between the solid electrolyte 3 and the insulating ring 7 is made via a glass solder (not shown). The insulating ring 7 is made so that it extends beyond the solid electrolyte 3 outward and thus also assumes the function of a flange. Between the flange 6 of the housing 2 and the flange 7 of the solid electrolyte 3, a seal (not shown) is preferably arranged. The cathode space located between the housing 2 and the solid electrolyte 3 is completely sealed against the anode space 5 and to the outside by means of the inward-pointing flange 6 of the metallic housing 2 and the outward-pointing flange 7 of the solid electrolyte 3. The anode space 5 is closed off by plate 8 which is placed on the flange 7 of the solid electrolyte 3. Between the flange 7 and the plate 8, a seal (not shown) is additionally arranged. The anodic current collector 9 is formed by a metal row which extends far into the solid electrolyte 3 and extends beyond the cover plate 8 by several millimeters. The cover plate 8 is provided with a feedthrough through which the anodic current collector 9 passes. The anodic current collector 9 is connected in the vicinity of this feedthrough to the cover plate 8 with the interposition of an insulation 19.

As already mentioned above, the space 4 between the metallic housing 2 and the solid electrolyte 3 serves as the cathode space. The latter contains the sulfur electrode according to the invention. In the manufacure of this sulfur electrode, a felt 11 is inserted before the solid electrolyte 3 is inserted into the storage cell 1 and the latter is finally closed off by the cover plate 8. This felt is a carbon felt or a graphite felt. Both are made from coked pitch fibers. The preparation of this felt is already within the state of the art and is a commercial product made by the Union Carbide Corporation under the tradename Thornel VMA-MAT and will not be explained here in further detail. The felt 11 is inserted into the cathode space 4 such that its principal fiber direction is parallel to the longitudinal axis of the storage cell. The amount of felt 11 used in such that the cathode space 4, particularly the space between the metallic housing and the solid electrolyte is filled completely. After the felt is arranged within the cathode space 4, the latter is saturated with a duromer 12. The duromer is an organic resin which will carbonize or coke on heating. Such resins are known. An example is a phenolic resin. This duromer is dissolved in a suitable solvent, preferably ethanol. The preferred amount of ethanol used is 50 to 95% by weight. The weight mentioned refers to the total weight of the duromer to be dissolved and the solvent used. In the embodiment example described here, the felt 11 is impregnated particularly with phenolic resin which is dissolved in ethanol. After the felt 11 is impregnated with the phenolic resin, the latter is distributed within the cathode space in such a manner that a larger amount of the phenolic resin is found in the region adjacent to the metallic housing 2. In the embodiment described here, the metallic housing 2 serves as the cathodic current collector 4B. This distribution of the duromer 12 within the cathode space 4 is achieved by setting the storage cell 1 into a rotary motion. The longitudinal axis of the storage cell 1 serves as the axis of rotation. During the rotation of the storage cell 1, the solvent of the duromer, particularly the ethanol is evaporated. When the desired distribution of duromer within the cathode space 4 is achieved, i.e. when the larger amount of duromer is located between the felt which is directly adjacent to the metallic housing 2, this process step is terminated. Arranging the duromer in the vicinity of the housing is a basis for assuring that the fibers of the felt 11 for the duromer 12 are well cemented to the housing 2. Subsequently, the duromer is coked. The duromer is coked at a temperature between 500° and 1500° C. This coking creates a substance which has graphite-like properties. The higher the coking temperature, the better are the graphite-like properties of this material. After the duromer 12 is coked, the felt 11 is saturated with sulfur. The desired amount of sulfur is placed into the cathode space 4 by a centrifugal casting method. After the felt 11 has cooled off, the solid electrolyte 3 filled with sodium can be inserted into the interior of the metallic housing 2. The felt arranged in the cathode space 4 is so elastic that its fibers follow closely the solid electrolyte 3 and surround the latter firmly so that no gap between the felt 11 and the solid electrolyte is generated. When the solid electrolyte 3 is inserted into the metallic housing, the interior of the solid electrolyte 3 which forms the anode space 5 is already filled with sodium and firmly closed off by the cover plate 8. The anodic current collector 9 is likewise installed in the above-described manner. After the solid electrolyte 3 is inserted, its flange 7 is further connected firmly to the flange 6 of the metallic housing 2. This completes the manufacture of the storage cell. It can then be set in operation. The mat 11 is cut to the required dimensions to fit into the coherent cathode space 4 and inserted into the cup-shaped housing as illustrated in FIG. 2a. The thickness of the mat is so dimensioned that a free space remains in the middle of the cell, into which the solid electrolyte can be inserted later. Additionally, the mat is so constructed and arranged that the fibers of the mat run parallel to the longitudinal axis of the solid electrolyte. After the mat is inserted, it is soaked with a duromer which is dissolved in ethanol as shown in FIG. 2b. Phenolic resin is especially suitable as the duromer. Thereafter, the cell housing, together with the mat arranged inside, is set in rotation during which evaporation of the solvent occurs, as illustrated in FIG. 2c. The longitudinal axis of the housing serves as the rotation axis. This has the effect of transporting the duromer outward toward the wall of the housing, and the greater part of the duromer is disposed in this region. The duromer 12 is disposed between the fibers. The coking (carbonization) of the duromer takes place after the rotation, when the greater part of the duromer is already arranged in the region of the cell housing. The distribution of the duromer in the mat is effected very simply, because the mat is permeable for the duromer and its solvent. All carbon and graphite felts are permeable, because otherwise soaking them with sulfur would be impossible, and the sulfur electrode could not be constructed in this way. During the rotation of the cell housing the solvent, in particular the ethanol is evaporated.

The invention relates not only to the embodiment examples shown in FIG. 1 and FIGS. 2a, 2b, 2c and 2d and explained in the corresponding description, the invention also includes storage cells which are equipped with several anode and several cathode spaces.

In these storage cells, each cathode space contains an anisotropic felt 11 which is impregnated with a duromer 12. The fibers of the felt are connected to the respective cathodic current collector 4B and to each other in an electrically conducting manner via the coked duromer.

We claim:

1. In a method for the manufacture of an electrochemical storage cell based on alkali metal and chalcogen with at least one anode space for the alkali metal anolyte and a cathode space for the chalcogen catholyte, with the anode space and the cathode space separated from each other by an alkali ion conducting solid electrolyte, and with at least one cathodic current collector and one electron-conducting matrix material arranged in the cathode space, the improvement comprising inserting into the cathode space an anisotropic carbon or graphite felt made of coked pitch fiber with its principal fiber direction parallel to the solid electrolyte, impregnating the felt with a solution of a duromer dissolved in a solvent, disposing a major amount of said duromer in the vicinity of said cathodic current collector, and subsequently carbonizing the duromer at a temperature of between 500° and 1500° C. in the cathode space.

2. Method according to claim 1, wherein said solution is a phenolic resin dissolved in ethanol, and wherein the felt, after being inserted into the cathode space, is impregnated with the solution of phenolic resin dissolved in ethanol.

3. Method according to claim 2, wherein the ethanol content of the solution is 50 to 95% by weight ethanol.

4. Method according to claim 1, wherein the solid electrolyte is cup-shaped and the metallic housing is cup-shaped, and wherein the storage cell is rotated about its longitudinal axis to accumulate duromer in the vicinity of the cathodic current collector.

5. Method according to claim 4, wherein the duromer is a phenolic resin which is dissolved in ethanol.

6. Method according to claim 5, wherein the ethanol is evaporated during the rotation of the storage cell.

* * * * *